United States Patent

Harris

[11] Patent Number: 5,291,566
[45] Date of Patent: * Mar. 1, 1994

[54] TOTAL INTERNAL REFLECTION ELECTRO-OPTIC MODULATOR FOR MULTIPLE AXIS AND ASYMMETRIC BEAM PROFILE MODULATION

[75] Inventor: Ellis D. Harris, Claremont, Calif.

[73] Assignee: Xerox Corporation, Stamford, Conn.

[*] Notice: The portion of the term of this patent subsequent to Oct. 6, 2009 has been disclaimed.

[21] Appl. No.: 862,927

[22] Filed: Apr. 3, 1992

[51] Int. Cl.$^5$ ............................................. G02B 6/12
[52] U.S. Cl. ................................. 385/8; 385/2; 385/4; 359/317
[58] Field of Search ................ 385/2, 4, 8; 359/317, 359/263, 279

[56] References Cited

U.S. PATENT DOCUMENTS 5,153,770 10/1992 Harris .............................. 385/2 X Primary Examiner—Rodney B. Bovernick
Assistant Examiner—Stephen W. Barns
Attorney, Agent, or Firm—William Propp

[57] ABSTRACT

The total internal reflection modulator has an electrode array distributed across an area of the reflecting surface of the electro-optic material. The electrode array has multiple sets of electrodes forming an outer rectangle interdigitated with at least one reference set of electrodes forming a inner diamond. A diamond-shaped area with no electrodes is preferably symmetrically within the inner electrodes of the electrode array on the reflecting surface. The uniform voltage difference between the electrodes and the varying lengths of the electrodes creates a fringe electrical field in the electro-optical material and an optical phase grating to diffract the incident light on the reflecting surface. The zero order nondiffracted light becomes the output beam. The optical phase grating will control the incident beam's optical profile at the modulator (near field) and hence the imaged spot size at a focus at the image plane (far field).

Alternatively, the total internal reflection modulator can have a diamond-shaped interdigitated electrode pattern within a rectangular shaped area with no electrodes. Using Schlieren optics, the non-zero order diffracted beam becomes the output beam with a modulated optical beam profile.

9 Claims, 3 Drawing Sheets

TOTAL INTERNAL REFLECTION ELECTRO-OPTIC MODULATOR FOR MULTIPLE AXIS AND ASYMMETRIC BEAM PROFILE MODULATION

BACKGROUND OF THE INVENTION

This invention relates to a total internal reflection (TIR) electro-optic modulator, and, more particularly, to a total internal reflection modulator for multiple axis and asymmetrical optical beam profile modulation.

Electro-optical devices have progressed in the art to provide a myriad of structures that operate on an electro-optic effect in a crystalline waveguide medium. Voltages are applied to an electrode array on the surface of the medium. These applied voltages cause the formation of a phase pattern in the medium which deflects and/or focuses the light wave propagating through the medium. This phenomenon occurs because an electric field, established in the medium by the voltages applied to the electrodes, varies the index of refraction of the medium sufficiently to change the relative phase of portions of the light wavefront as it propagates through the medium.

Total internal reflection electro-optic modulating devices have come into prominence and attention. In these devices, a set of interdigitated electrodes are employed on a major surface of the electro-optic medium to induce fringe electric fields into the electro-optic medium. Incident light is totally internally reflected from the major surface achieving interaction with fringe electric fields as the light passes near the surface of the material at close to grazing incidence.

More recently, it has been suggested to individually address alternate sets of electrodes in the total internal reflection electro-optic modulators. Voltages are applied to one set of interdigitated electrodes while the other set of interdigitated electrodes remain at a reference voltage level, such as ground, to produce a phase modulation of the light beam at the location of each addressed electrode. By applying a voltage difference to a pair of electrodes, the local magnitude of the electrical fringe field between them can be controlled and varied to permit deflection of the light to a predetermined point at an image plane.

Total internal reflection electro-optic modulators are used for wavelength separation of the incident light beam (U.S. Pat. No. 4,125,318), to form a diffraction pattern of a incoherent, unpolarized, nonconvergent, incident light beam (U.S. Pat. No. 3,958,862), as an electro-optic scanning device for deflection of a light beam across an image plane (U.S. Pat. No. 4,386,827, this patent being assigned to the assignee herein) or to convert an electronic signal pattern into a corresponding light intensity profile (U.S. Pat. No. 4,281,904).

It is known that changing an aperture size will change the profile of an incident light beam. Thus, tilting an aperture is a mechanical means of modulating a beam profile, and hence spot size of a light beam at an image plane. Typically, a sliding or rotating variable neutral density wedge is used to modulate the optical beam profile.

However, nonmechanical means, preferably electronic means, are needed to modulate an optical beam profile within an electronic optical device. The availability of electronic means to modify an optical beam will greatly increase the speed of response and thus the information bandwidth of the modulation channel. Electronic means of optical beam profile modulation will enable the potential of real time beam profile variation by computer control.

One recent total internal reflection modulator (U.S. Pat. No. 5,153,770) has the interdigitated electrodes of an electrode array extending inward from a rectangular-shaped outer electrode conducting block and outward from a diamond-shaped inner electrode conducting block. A diamond-shaped area with no electrodes is surrounded by the electrode array on the reflecting surface of the modulator. The uniform voltage difference between the electrodes and the varying lengths of the electrodes from the diamond within the rectangle pattern of the array will create a fringe electric field in the electro-optical material and an optical phase grating to diffract the incident light on the reflecting surface. The zero order nondiffracted light from the array and the reflected light from the non-electroded area becomes the modulated output beam. An alternate embodiment of that total internal reflection modulator has a diamond-shaped interdigitated electrode pattern within a rectangular shaped area with no electrodes. Using Schlieren optics, the non-zero order diffracted beam becomes the output beam with a modulated optical beam profile. However, these devices only modulate the optical beam profile along one axis and can only modulate the beam symmetrically.

It is an object of this invention therefore to provide a novel total internal reflection electro-optic modulator to modulate an optical beam profile along more than one axis.

It is another object of this invention to provide a total internal reflection electro-optic modulator to asymmetrically modulate an optical beam profile.

It is yet another object of this invention to provide a total internal reflection electro-optic modulator wherein the electrodes in a multiple electrode array are not individually addressable but the voltage for each set of electrodes is nonetheless varied.

SUMMARY OF THE INVENTION

In accordance with the present invention, the total internal reflection electro-optic modulator has an electrode array distributed across an area of the reflecting surface of the electro-optic material. The electrode array has multiple sets of electrodes forming an outer rectangle interdigitated with at least one reference set of electrodes forming an inner diamond. A diamond-shaped area with no electrodes is preferably symmetrically within the inner electrodes of the electrode array on the reflecting surface. The uniform voltage difference between the electrodes and the varying lengths of the electrodes creates a fringe electrical field in the electro-optical material and an optical phase grating to diffract the incident light on the reflecting surface. The zero order nondiffracted light becomes the output beam. The optical phase grating will control the incident beam's optical profile at the modulator (near field) and hence the imaged spot size at a focus at the image plane (far field).

Alternatively, the total internal reflection modulator can have a diamond-shaped interdigitated electrode pattern within a rectangular shaped area with no electrodes. Using Schlieren optics, the non-zero order diffracted beam becomes the output beam with a modulated optical beam profile.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
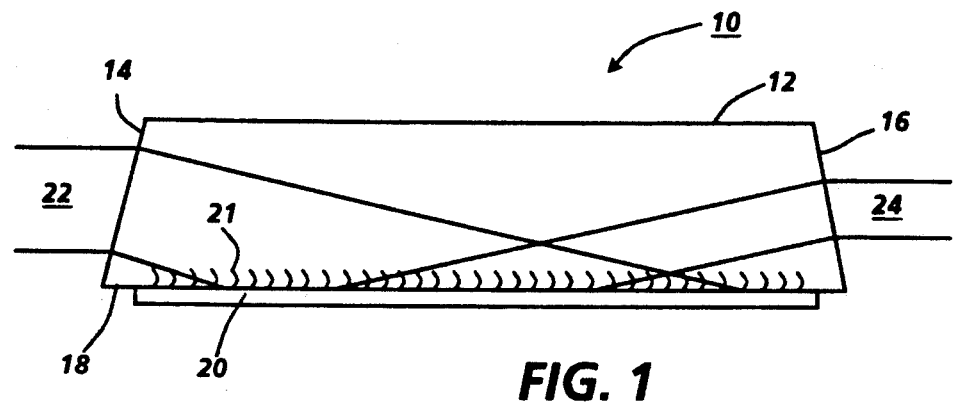
FIG. 1 is a schematic illustration of the side view of the total internal reflection modulator formed according to the present invention.

Reference is now made to FIG. 1 wherein there is disclosed a total internal reflection (TIR) modulator 10 consisting of electro-optic material formed of a LiNbO3 x-y cut crystal 12. The crystal has three polished surfaces, an input face 14, an opposing output face 16, and an intermediate or longitudinal reflecting surface 18 between the input and output faces. An electrode array 20 is distributed across an area of the reflecting surface 18. In a preferred embodiment, the electrode array 20 would comprise essentially the full width and length of the reflecting surface 18. This electrode array is deposited upon or is proximate to the electro-optic medium such as to induce fringe electric fields 21 into the electro-optic medium 12. It will be appreciated that alternate shapes for the modulator crystal, other than one shown in FIG. 1, are possible to achieve the required reflection. In the form shown, a crystal with overall dimensions of about 4×4×15 millimeters provides satisfactory operation.

An incident beam 22 of collimated light of a single wavelength, parallel to the plane of the reflecting surface 18 and electrode array 20 enters the total internal reflection modulator 10 through the input end face 14. The incident beam is refracted at the angled surface of the input end face 14 onto the reflecting surface 18 at a grazing angle of incidence. The electrode array 20 is proximately coupled to the reflecting surface 18. The incident beam is totally internally reflected from the surface 18 and modulated by any fringing electric field 21 from the electrode array 20 extending into the electro-optic medium 12 to provide an output beam 24 which exits from the electro-optic element 10 through its angled output face 16. The output beam 24 is refracted at the output face 16 collinear with the incident beam 22, that is parallel to the plane of the reflecting surface 18 and electrode array 20.

It is convenient, but not essential, that the end surfaces of the input face 14 and output face 16 are cut at a bevel so as to refract incident beam 22 and outgoing beam 24 into a grazing angle of incidence at reflecting surface 18. The end surfaces can also be cut at the Brewster angle for the light beam, such that reflection losses at the input and output faces are minimized. Instead of an incident monochromatic beam, polychromatic light may also be used. And, although a collimated beam of light is the preferred method, other conditions of beam convergence or divergence for the incident beam may be used.

Figure 2:
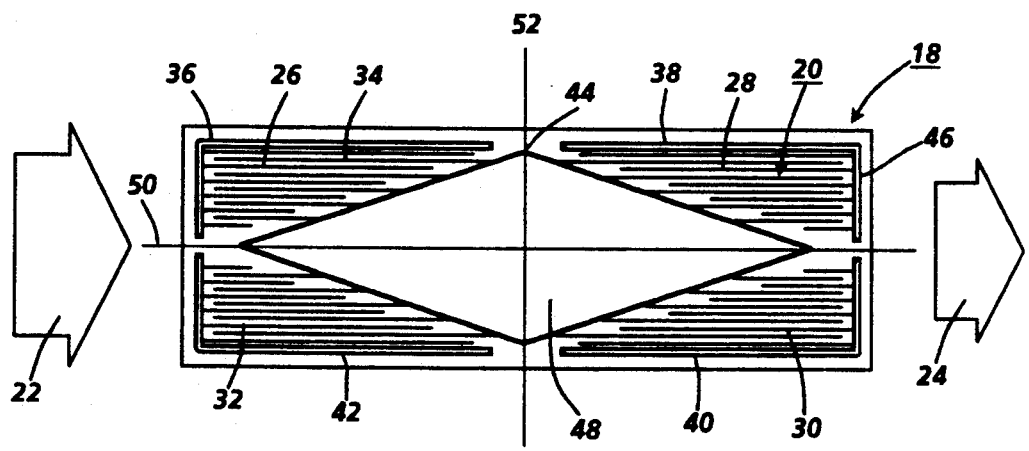
FIG. 2 is a schematic illustration of the electrode array of the total internal reflection modulator of FIG. 1 formed according to the present invention.

The electrode array 20 is vacuum deposited on the reflecting surface 18 in an interdigitated pattern as shown in FIG. 2 through photoresist masking or etching methods that are known to those of ordinary skill in the art. The electrodes are typically 5 microns wide with a pitch (or distance between the centers of adjacent individual interdigitated electrodes) of 10 microns. The electrodes are, preferably, vacuum deposited copper on chromium which offers good adhesion properties to the reflecting surface. Typical thicknesses are 1 and 10 microns for chromium and copper respectively.

The electrode array 20 is symmetrically patterned on the reflecting surface 18 with four right triangular sets of electrodes 26, 28, 30 and 32 interdigitated with a single alternate set of electrodes 34. Each of the four right triangle sets of electrodes is independently addressable through the conducting block formed by the sides of the triangle adjacent to the right angle of the electrode set. Thus, electrode set 26 has electrode block 36, electrode set 28 has electrode block 38, electrode set 30 has electrode block 40 and electrode set 32 has electrode block 42.

The single alternate set of electrodes 34 extends outward from a diamond-shaped inner electrode conducting block 44 interdigitating with the four sets of electrodes 26, 28, 30 and 32 extending inward from an outer rectangle 46 formed by the conducting block sides 36, 38, 40 and 42 of the four right triangular sets of electrodes. The right angle of the triangular set of electrodes is at each of the four corners of the rectangle 46.

A diamond-shaped region 48 with no electrodes is preferably symmetrically within the inner alternate electrode conducting block 44 of the electrode array on the reflecting surface. An alternate description of the electrode array 20 is an inverse, or antipodal, diamond-shaped interdigitated electrode pattern within a rectangle 46 surrounding a diamond-shaped non-electroded area 48 on the reflecting surface 18.

The axes of the diamond-shaped region 48 with no electrodes are aligned with the optical axis 50 and the transverse axis 52, perpendicular to the optical axis. The optical axis 50 is the direction the incident beam and the output beam propagate along the reflecting surface within the electro-optic medium of the total internal reflection modulator. The longitudinal direction of the reflecting surface 18 and the lengths of the interdigitated electrodes 26, 28, 30 and 32 and 34 are also along the optical axis 50. The four right triangular set of electrodes 26, 28, 30 and 32 are aligned between the optical axis and the transverse axis, centered at approximately 30 to 60 degrees from either axis. The inverse diamond electrode pattern within a rectangular outer edge provides for uniformly increasing or decreasing electrode lengths in the electrode array.

Voltages can be applied to one of the four sets of the electrodes 26, 28, 30 and 32 through its conducting block while the single alternate set of electrodes 34, interdigitated with the one electrode set, remains at a reference voltage level, such as ground, through its conducting block. Alternatively, these electrode sets could be driven by a push-pull arrangement with each set of interdigitated electrodes having opposite polarity to the other.

Figure 3:
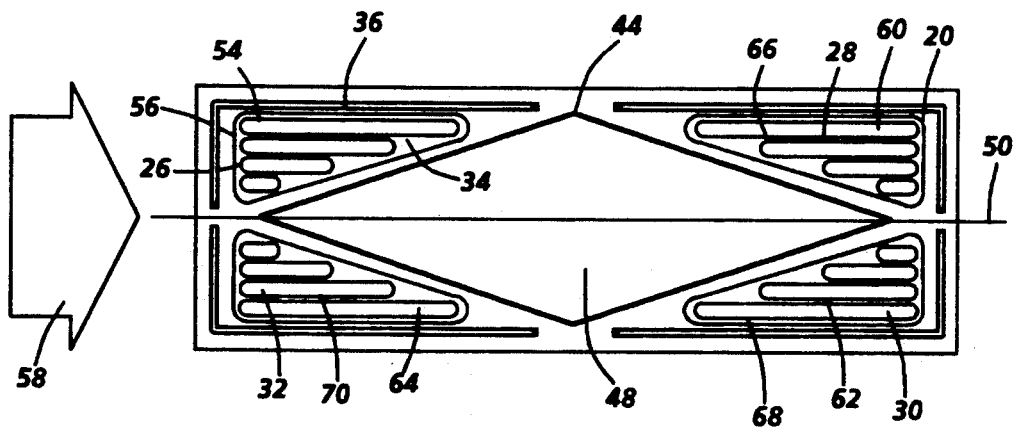
FIG. 3 is a schematic illustration of the optical phase gratings formed by the electrode array of FIG. 2 according to the present invention.

In FIG. 3, voltage is applied to electrode set 26 in a portion 54 of the array 20 while the single alternate set of electrodes 34 remains at ground. These applied voltages create localized fringe electric fields between adjacent interdigitated electrodes. The electric fields extend for a short distance equal to approximately one-half the electrode pitch into the electro-optic medium from the reflecting surface.

Because the interdigitated electrode pattern is periodic and because the localized fringe electric fields produce transverse localized variations in the refractive index within the electro-optic medium, an optical phase grating 56 is established within the electro-optic medium proximate to the adjacent interdigitated electrode pairs.

Since the incident light to the modulator is totally internally reflected at the reflecting surface 18 where the optical phase grating 54 has been produced by the electrode array 20, the phase front 58 of the light is diffracted as it propagates through the electro-optic medium. This diffraction causes the light beam to be spatially phase front modulated as it propagates through the electro-optic medium in accordance with the electrode pattern of that portion of the array on the reflecting surface.

With the two sets of interdigitated electrodes 26 and 34 set at zero voltage or ground, that portion 54 of the electrode array 20 does not produce an optical phase grating 56 in the electro-optic medium and that portion 54 of the reflecting surface 18 functions as a purely totally internally reflecting surface. The incident beam is neither diffracted nor modulated but merely reflected by that portion of the electrode array and the output beam emerges from the electro-optic medium unchanged from the incident beam.

The inverse diamond electrode pattern of the four sets of electrodes within a rectangular outer edge provides for uniformly increasing or decreasing electrode lengths in the electrode array. With a voltage difference applied between the conducting blocks, the various lengths of the individual electrodes along the optical or longitudinal axis 50 of the reflecting surface determine the length of interaction of the beam with the induced phase grating in the electro-optic medium. These voltages produce a pattern of optical phase gratings within the medium which diffract the incident light according to the induced pattern. The magnitude of the diffraction of any portion of the beam is determined by both the applied voltage and the length of the interaction as determined by the pair of interdigitated electrodes which form the specific optical phase grating modulating that portion of the beam.

The magnitude and pattern of the applied voltage and the resulting induced electric field within the electro-optic medium determines the resulting optical phase grating within the total internal reflection modulator. An electric field of either polarity will produce the effect. Alternating positive and negative polarity for the non-reference set of interdigitated electrodes will prevent charge trapping within the crystal medium lattice but is not essential to the operation of the invention.

In the electroded area 54 of the electrode array 20, the incident beam flux is diffracted into a series of orders whose intensities vary with electrode voltage. At zero voltage, no light is diffracted and all the optical flux remains in the zero order beam. As a voltage difference is applied to the interdigitated electrodes 26 and 34, the combination of the electrode array and electro-optical medium forms an induced phase grating 56 which diffracts the incident beam throwing optical flux into the higher diffraction orders. The intensity of the zero order portion of the beam is thus reduced. At some maximum applied voltage difference, the zero order of the diffracted output beam for a local region of the electrode array will be effectively extinguished, the energy having been transferred to other higher diffraction orders.

For the portion 54 of the electrode array, the voltage difference between the electrode conducting block 36 and the reference electrode conducting block 44 is uniform. Therefore the voltage difference between the interdigitated electrodes 26 and 34 is also uniform, even though the electrodes have varying lengths. The optical phase grating created by this uniform voltage difference and varying lengths attenuates the incident light into higher diffraction orders. The optical phase grating attenuates the light between the optical axis and the transverse axis.

The non-electroded area 48 within the electrode array 20 continues to function as a purely totally internally reflecting surface even when voltage is applied to the adjacent portion 54 of the interdigitated electrodes surrounding the non-electrode area. This non-electrode area does not diffract nor modulate the incident beam but merely reflects the light incident upon the area at the total internal reflection surface as a zero order output beam.

As best seen in FIG. 3, each of the four sets of electrodes 26, 28, 30 and 32 is independently addressable at a separate voltage and interdigitated with a single alternate set of electrodes 34, which remains at a reference voltage level, such as ground. Thus, the electrode array consists physically of four electroded portions 54, 60, 62 and 64 and a non-electroded area 48. Optically, on the reflecting surface 18 are four optical phase gratings 56, 66, 68 and 70 formed by the electrode sets and a totally internal reflecting surface of the non-electrode area. Along the optical axis, the longer the lengths of the interdigitated electrodes, the shorter the length of the non-electroded area with the result of the greater the optical phase grating to diffract the incident light and the lesser the reflecting surface to reflect the incident light.

The magnitude of the diffraction is determined by both the applied voltage and the electrode length in the region of electro-optical interaction, the localized fringe electric field of the optical phase grating. When no voltage is applied, there is no diffraction. When a maximum voltage is applied, optical flux in regions where there are electrodes can be largely removed from the beam, leaving the beam cross-section essentially as determined by the non electrode area. At intermediate voltages, the beam cross-section will lie between these two extremes.

As each set of electrodes is independently addressable, a different voltage can be applied to each set forming a different optical phase grating which will provide a different modulation of a portion of the beam. The optical profile of the beam can thus be modulated along multiple axis or along either the optical axis or the transverse axis or any angular axis between the optical and transverse axes or along any combination of axes. Furthermore, the optical profile can be modulated asymmetrically by varying the voltages to the four electroded portions of the array. The voltage applied to such an electrode array of the total internal reflection modulator will thus control the beam profile and hence the imaged spot size at a focus at the image plane.

As shown in FIG. 1, no Schlieren or other optics are needed to convert the spatial phase front modulation of the output beam 24 into a correspondingly modulated intensity profile.

When the applied voltages to the several electrode sets are adjusted in real time, the optical beam profile will be modulated also in real time. In an optical printing system, this process can be used to vary line width and position to provide image enhancement. The effective spot position can be adjusted to correct pixel placement errors.

Selective application of voltages to the electrode sets will modify an oversize optical beam transmitted through the total internal reflection modulator by selectively attenuating portions of the beam. The resulting beam spot can thus be effectively moved or its size changed by a measured amount along either the optical axis or the transverse axis. In image enhancement applications, this effect can be used to remove jagged edges from a slanting line or to improve the fine resolution of font characters. These functions cannot be conveniently done by electronics. The possibility of spatial pixel modulation along a scan line offers an alternative to electronic positioning or stretching of a pixel.

The voltage applied to the total internal reflection modulator 10 will thus control the local beam profile at the device (near field) and hence the imaged spot size at a focus at the image plane (far field). Other shapes, such as elliptical or oval, for example, can be used for the non-electrode area with the surrounding electrode array being the inverse or antipodal shape.

Figure 4:
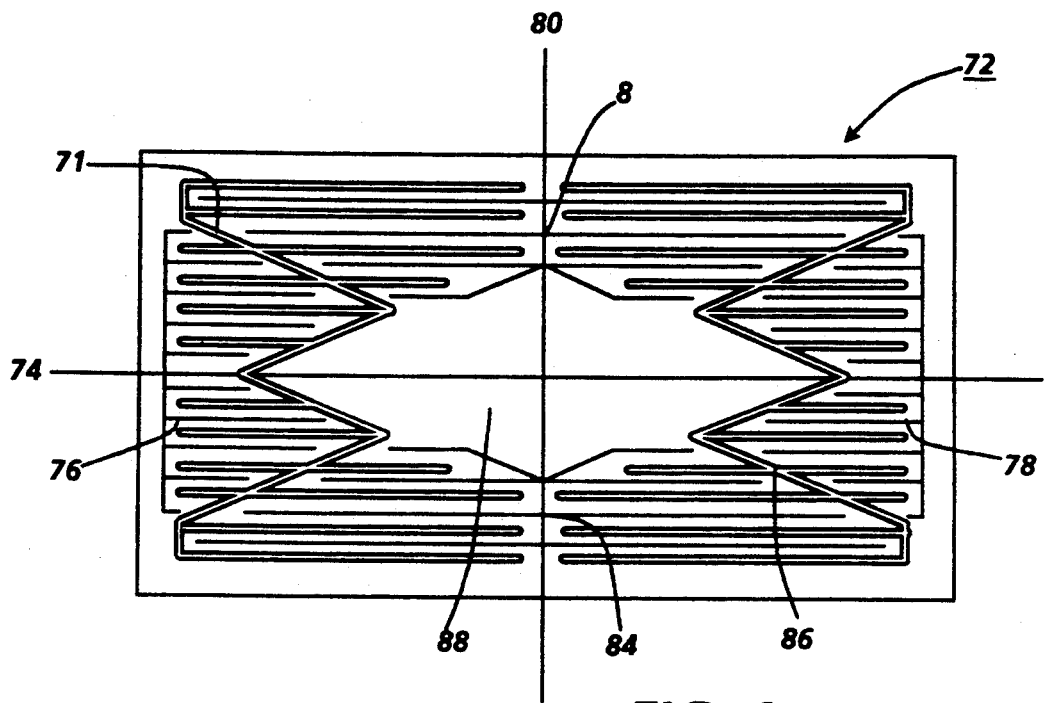
FIG. 4 is a schematic illustration of an alternate embodiment of the electrode array of a total internal reflection modulator formed according to the present invention.

An alternate embodiment of the rectangle surrounding the diamond-shape electrode array pattern 71 of the total internal reflection modulator 72 of FIG. 4 has the four sets of electrodes aligned with either the optical axis 74 or the transverse axis. Along the optical axis 74 are outer electrodes 76 and 78 and along the transverse axis 80 are inner electrodes 82 and 84. The four sets of electrodes 76, 78, 82 and 84 are isosceles triangle shaped with an inverted smaller isosceles triangle as the crown, or alternatively can be described as M or W shaped. The four sets of electrodes are interdigitated with a single alternate set of electrodes 86.

The alternate electrode set extends outward from the inside diamond along the optical axis and extends inward from the outside rectangle along the transverse axis. The alternate set of electrodes has parallel sides along the transverse axis and M or W shaped indentions along the optical axis.

A diamond shaped region 88 with no electrodes is preferably symmetrically within the alternate set of electrodes 86 along the optical axis 74 and within electrodes 82 and 84 along the transverse axis 80. The combination of the four sets of electrodes 76, 78, 82 and 84 interdigitated with the single alternate set of electrodes 86 forms the rectangle surrounding the diamond-shape electrode array pattern 71.

Figure 5:
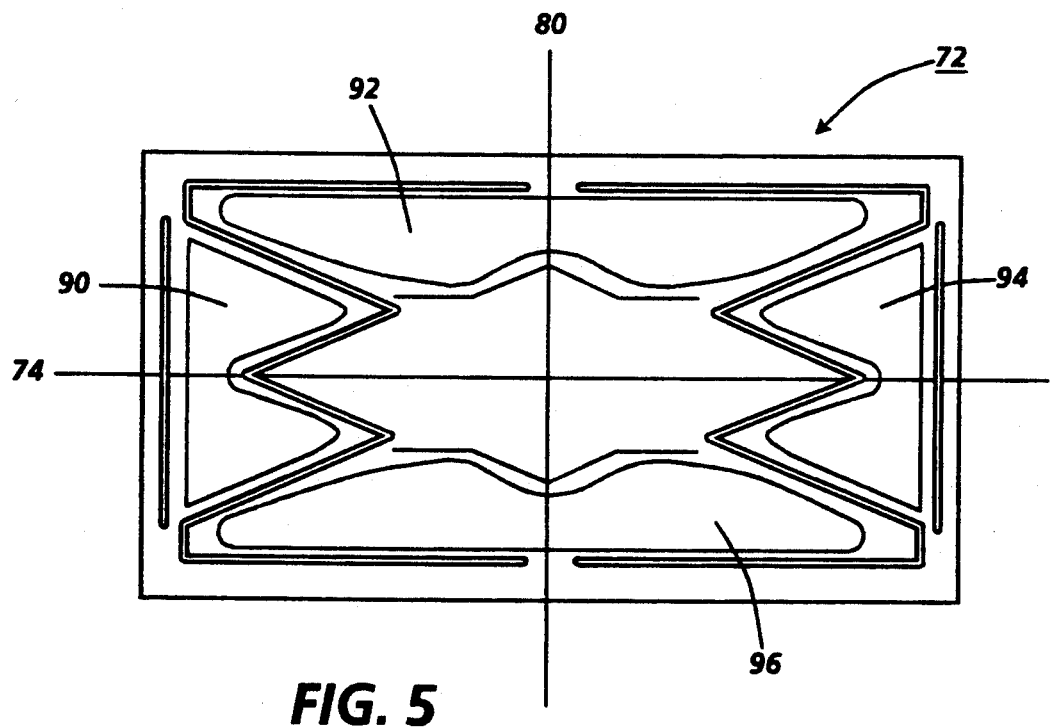
FIG. 5 is a schematic illustration of the optical phase gratings formed by the electrode array of FIG. 4 according to the present invention.

The total internal reflection modulator 72 of FIG. 4 will electrically and optically function the same as the total internal reflection modulator 10 of FIGS. 1 and 2 except that the optical phase gratings 90, 92, 94 and 96 as shown in FIG. 5 created by the four sets of electrodes interdigitated with the single reference set of electrodes are aligned with either the optical axis 74 or the transverse axis 80.

Figure 6:
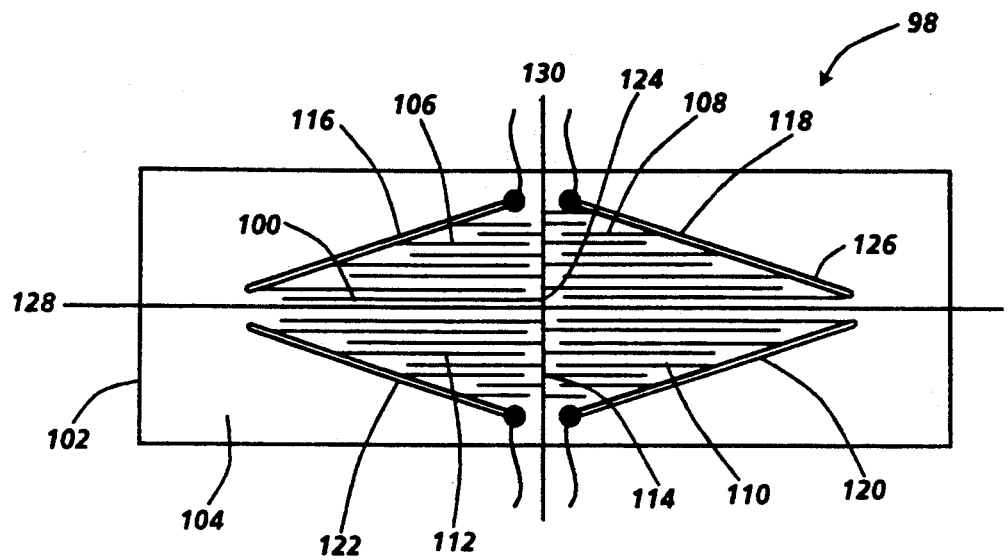
FIG. 6 is a schematic illustration of another alternate embodiment of the electrode array of a total internal reflection modulator formed according to the present invention.

The total internal reflection modulator 98 of FIG. 6 is identical in structure to that of the total internal reflection modulator 10 of FIG. 1, except the electrode array 100 on the reflecting surface 102 is diamond-shaped and the remainder 104 of the rectangular-shaped reflecting surface has no electrodes. The diffracted optical flux is used as the principal output beam by a Schlieren optical system.

The electrode array 100 is symmetrically patterned on the reflecting surface 102 with four right triangular sets of electrodes 106, 108, 110 and 112 interdigitated with a single alternate set of electrodes 114. Each of the four right triangle sets of electrodes is independently addressable through the conducting block formed by the hypotenuse of the triangle opposite to the right angle of the electrode set. Thus, electrode set 106 has electrode block 116, electrode set 108 has electrode block 118, electrode set 110 has electrode block 120 and electrode set 112 has electrode block 122.

The single alternate set of electrodes 114 extends outward from a cross-shaped inner electrode conducting block 124 interdigitating with the four sets of electrodes 106, 108, 110 and 112 extending inward from an outer diamond 126 formed by the hypotenuse electrode conducting blocks 116, 118, 120 and 122 of the four right triangular sets of electrodes. The right angles of the triangular set of electrodes are adjacent at the center of the electrode array. The axes of the diamond shaped electrode array 100 are aligned with the optical axis 128 and the transverse axis 130.

The rectangular area 104 with no electrodes preferably symmetrically surrounds the diamond shaped electrode array 100. An alternate description of the non-electroded area 104 is an inverse, or antipodal, diamond-shaped non-electroded area pattern within a rectangle surrounding a diamond-shaped electrode array 100 on the reflecting surface 102.

The lengths of the interdigitated electrodes of the electrode array 100 extend in the longitudinal direction or optical axis 128 of the reflecting surface 102, and the incident beam and output beam (both not shown) propagate generally in that longitudinal direction. The diamond electrode pattern provides for uniformly increasing or decreasing electrode lengths in the electrode array.

Similar to the total internal reflection modulator 10 of FIG. 1, voltages are applied to one of the four sets of the interdigitated electrodes through its conducting block while the other alternate set of interdigitated electrodes through its conducting block remains at a reference voltage level, such as ground. These applied voltages create localized fringe electric fields between adjacent interdigitated electrodes in that portion of the electrode array.

Because the interdigitated electrode pattern is periodic and because the localized fringe electric fields produce transverse localized variations in the refractive index within the electro-optic medium, an optical phase grating is established within the electro-optic medium proximate to the adjacent interdigitated electrode pairs for that portion of the electrode array.

Since the incident light to the modulator is totally internally reflected at the reflecting surface where the optical phase grating has been produced by a portion of the electrode array, the phase front of the light is diffracted as it propagates through the electro-optic medium. The output beam is diffracted into a series of orders whose intensities vary with electrode voltage. This diffraction causes the light beam to be spatially phase front modulated as it propagates through the electro-optic medium in accordance with that portion of the electrode pattern of the array on the reflecting surface.

Unlike the total internal reflection modulator 10 of FIG. 1 where the zero order, non-diffracted component of the output beam is used to obtain the image of the beam profile at the image plane, the nonzero, higher order diffraction components of the output beam are used to obtain the image of the beam profile at the image plane.

Schlieren dark field imaging optics are employed to convert the spatial phase front modulation of the output beam from the total internal reflection modulator 98 into a correspondingly modulated intensity profile and to provide any magnification necessary to obtain an image of the desired size on the image plane, as is known to those of ordinary skill in the art.

Figure 7:
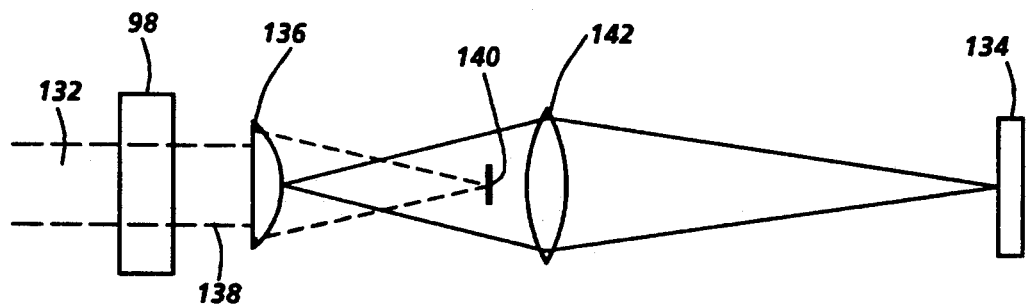
FIG. 7 is a schematic illustration of the side view of the total internal reflection modulator of FIG. 6 and Schlieren dark field imaging optics formed according to the present invention.

An incident beam 132 is reflected and diffracted by the total internal reflection modulator 98 in FIG. 7. The Schlieren central dark field imaging optics are optically aligned between the total internal reflection modulator 98 and the image plane 134. The imaging optics typically include a field lens 136 for focusing the diffracted output beam 138 of the total internal reflection modulator onto the central stop 140. The field lens is optically aligned between the total internal reflection modulator and the stop so that substantially all of the zero order diffraction components of the output beam are focussed on the stop. However, the higher order diffraction components of the output beam scatter around the stop and are collected by the imaging lens 142 which, in turn, causes them to focuses onto the image plane 134, thereby providing an intensity modulated image by the total internal reflection modulator.

At zero voltage applied to the electrode array 100 of the total internal reflection modulator 98, there is no phase grating formed at the reflecting surface, so there is no diffraction. The reflecting surface 102 functions as a purely totally reflecting surface. The incident beam remains a zero order, non-diffracted beam and the output beam emerges from the total internal reflection modulator 98 unchanged from the incident beam. The output beam is focussed by the field lens 136 onto the stop 140. None of the beam is therefore imaged onto the image plane 134.

As intermediate voltages are applied to a portion of the electrode array, the interdigitated electrodes form optical phase gratings such that the incident beam is diffracted at that portion of the diamond shaped electroded areas of the reflecting surface into zero and higher order components of a diffracted output beam. The zero order components of the diffracted beam and the components of the beam reflected at the surface in the non-electrode area are blocked by the stop while the higher order diffraction components of the output beam are collected by the imaging lens to be reimaged on the image plane. The beam cross-section essentially is determined by portions of the beam diffracted by the electrode array.

When a maximum voltage is applied to that portion of the electrode array, the optical phase grating formed by the interdigitated electrodes diffract the incident light almost totally into nonzero, higher order components of a diffracted output beam. The zero order components of the beam reflected at the surface in the non-electrode area are blocked by the stop while the higher order diffraction components of the output beam are collected by the imaging lens to be reimaged on the image plane. The beam cross-section essentially is determined by the diamond shaped electrode array.

As in the total internal reflection modulator 10 of FIGS. 1 and 2, the voltage difference between the conducting blocks of each of the four sets of electrodes and the alternate set of electrodes of the total internal reflection modulator 98 of FIG. 6 is uniform. Therefore, the voltage difference between the interdigitated electrodes of the portion of the array is also uniform, even though the electrodes have varying lengths. The optical phase grating for that portion of the electrode array created by this uniform voltage difference and varying lengths attenuates the incident light into higher diffraction orders where the Schlieren optics system converts the spatial phase front modulation of the output beam into a correspondingly modulated intensity profile.

Just as the electrode array 100 of total internal reflection modulator 98 of FIG. 6 is the inverse of the electrode array 20 of total internal reflection modulator 10 of FIG. 2, a diamond shaped electrode array for a total internal reflection modulator consisting of four diamond shaped sets of electrodes would be the inverse of the electrode array 71 of total internal reflection modulator 72 of FIG. 4.

The voltage applied to the total internal reflection modulator 98 will thus control the imaged spot size at a focus at the image plane (far field). Other shapes, such as elliptical or oval, for example, can be used for the electroded array with the surrounding non-electrode area being the inverse or antipodal shape.

The four sets of electrodes interdigitated with a single alternate reference set of electrodes of the total internal reflection modulator 10 of FIGS. 1 and 2, modulator 71 of FIG. 4, and modulator 98 of FIG. 6 are merely illustrative examples. The sets of electrodes can be of any number. The individual sets of electrodes need not be along either the optical axis or transverse axis nor between the axes but along any axes of the reflecting surface. The axes need not be symmetric or perpendicular nor limited to just two axes. These factors can better modulate the optical beam profile.

The reference set of electrodes can be more than a single set. The reference sets of electrodes can equal the other sets of electrodes and be aligned on a one-to-one basis. If the single alternate set of electrodes of array 20 of FIG. 2, array 71 of FIG. 4 and array 100 of FIG. 6 were four sets of electrodes and the four sets of electrodes were a single set, their functions as reference and voltage applied sets could be reversed with no loss of optical modulation function. Schlieren optics may be needed for these alternative total internal reflection electrode arrays.

The use of right triangles, rectangles and diamond shapes were also merely illustrative. The electrode arrays and their component portion patterns need not be symmetric, nor the same shape as each other, nor any known geometric shape at all, depending upon the modulation desired for the optical beam.

Alternatively, the input face and the output face of the various total internal reflection modulators herein described can be parallel to each other and perpendicular to the reflecting surface. As is known in the art, the input beam is transmitted through the input face of the electro-optic medium at a grazing angle of incidence relative to the reflecting surface (i.e., an angle no greater than the critical angle of incidence for total internal reflectance from the surface) and is brought to a wedge-shaped focus on that surface approximately midway through the electro-optic medium. Consequently, the input beam is totally internally reflected from the reflecting surface to provide an output beam which exits from the electro-optic medium through its output face.

The electrode array and the electro-optic medium of the various embodiments of the total internal reflection modulators may be physically distinct components which are pressed or otherwise firmly held together to achieve "proximately coupling", as is known to those of ordinary skill in the art.

The electrical interface can be significantly simplified if the electrodes of the array are fabricated on a separate substrate, such as a silicon integrated circuit, and pressed or otherwise held closely adjacent to the electro-optic medium to "proximately couple" electric fields into the electro-optic medium.

To couple these fields into the electro-optic medium, the electrodes of the array are supported on or very near the reflecting surface of the electro-optic medium. For example, the electrodes can be defined by suitably patterning an electrically conductive, metallization layer, which is deposited on and incorporated in of a LSI or a VLSI silicon integrated circuit.

Furthermore, the silicon circuit is pressed or otherwise firmly held against the electro-optic element to maintain the electrodes in contact with or closely adjacent to the reflecting surface of the electro-optic medium. The advantage of this construction is that the silicon circuit may be used to make the necessary electrical connections to the electrodes for the addressing and driving electronics of the electrode array, thereby simplifying the electrical interface of the total internal reflection modulators.

The total internal reflection modulators described are at least substantially insensitive to temperature variation because a phase-modulated technique is used which is virtually independent of temperature if temperature-independent electro-optic coefficients are used, for example, $r_{22}$ in $LiNbO_3$. Suitable electro-optic materials besides $LiNbO_3$ include $LiTaO_3$, BSN, ADP, KDP, $KD^xP$, KDA, PLZT and $Ba_2NaNb_5O_{15}$.

While the invention has been described in conjunction with specific embodiments, it is evident that many alternatives, modifications and variations will be apparent to those skilled in the art in light of the foregoing description. Accordingly, the invention is intended to embrace all such alternatives, modifications and variations as fall within the spirit and scope of the appended claims.

What is claimed is:

1. A total internal reflection electro-optical modulator comprising:

an electro-optical material having first, second and third surfaces, an electrode pattern array proximate to said first surface of said electro-optical material, said electrode pattern array comprising multiple sets of electrodes of varying lengths interdigitated with at least one set of electrodes of corresponding varying lengths, each of the electrodes of said multiple sets being addressable at a uniform voltage level, said at least one set of electrodes being set at a reference voltage level, the voltage levels applied to said multiple sets of electrodes inducing a localized electric field adjacent said first surface of said electro-optical material, and a coherent light beam parallel to said first surface is deflected at said second and third surfaces to suffer total internal reflection at said first surface, the lengths of said electrodes in said electrode pattern array extending in the general direction of travel of said coherent light beam, and said localized electric field producing a spatial modulation of said coherent light beam's optical profile corresponding to the location of each electrode, the local magnitude of which is related to the length of said electrode.

2. The total internal reflection electro-optical modulator of claim 1 wherein said first surface comprises said electrode pattern array and a non-electrode area.

3. The total internal reflection electro-optical modulator of claim 2 wherein said coherent light beam's optical profile corresponds to the profile of said non-electrode area.

4. The total internal reflection electro-optical modulator of claim 3 wherein said multiple sets of electrodes comprises four sets of electrodes forming an antipodal diamond within a rectangle and said non-electrode area is diamond-shaped.

5. The total internal reflection electro-optical modulator of claim 4 wherein each of said four sets of electrodes are right triangular in shape and aligned between the optical axis and the transverse axis of said reflecting surface.

6. The total internal reflection electro-optical modulator of claim 4 wherein each of said four sets of electrodes are isosceles triangular in shape with an inverted smaller isosceles triangle as the crown and aligned with either the optical axis or the transverse axis of said reflecting surface.

7. The total internal reflection electro-optical modulator of claim 2 wherein said coherent light beam's optical profile corresponds to the profile of said electrode pattern array.

8. The total internal reflection electro-optical modulator of claim 7 wherein said multiple sets of electrodes comprises four sets of electrodes forming a diamond in shape and said non-electrode area is antipodal diamond-shaped within a rectangle.

9. The total internal reflection electro-optical modulator of claim 1 further comprising a separate substrate for supporting said electrode pattern array, and means for proximately coupling said substrate against said electro-optical material whereby said electrode pattern array is proximate to said first surface of said electro-optical material.

* * * * *